Dec. 13, 1960  A. L. LABBE  2,964,129
APPARATUS FOR SHAKING FILTER BAGS
Filed April 6, 1959  5 Sheets-Sheet 1

INVENTOR.
Armand L. Labbe
BY
Andros and Smith
Attorneys

INVENTOR.
Armand L. Labbe
BY Andros and Smith
Attorneys

Dec. 13, 1960 A. L. LABBE 2,964,129
APPARATUS FOR SHAKING FILTER BAGS
Filed April 6, 1959 5 Sheets-Sheet 4

INVENTOR.
Armand L. Labbe
BY Andros and Smith
Attorneys

Dec. 13, 1960 A. L. LABBE 2,964,129
APPARATUS FOR SHAKING FILTER BAGS
Filed April 6, 1959 5 Sheets-Sheet 5

INVENTOR.
Armand L. Labbe
BY Andros and Smith
Attorneys

United States Patent Office 2,964,129
Patented Dec. 13, 1960

2,964,129

APPARATUS FOR SHAKING FILTER BAGS

Armand L. Labbe, 1388 Federal Way,
Salt Lake City, Utah

Filed Apr. 6, 1959, Ser. No. 804,236

10 Claims. (Cl. 183—54)

My invention relates to an apparatus for shaking filter bags in bag houses. In general, the types of dust collectors to which this invention relates consist of a chamber having a series of tubular elements called "bags" suspended therein. The bags are closed at their upper ends from which they are suspended from supports and open at the lower ends where they are held in fixed position.

Air, gases or smoke to be filtered are brought into the chamber so that they must enter the bags at the fixed lower open ends thereof. The fluids are induced to flow up into and through the walls of the filter bags along their entire length and are then exhausted from the chamber to the atmosphere or to a gas recovery system. The dust or particles filtered from the fluids is held and collected by the bag walls in between the threads of which the bags are woven. After a length of time the bag walls become so clogged with accumulated dust that the filtering operation must be stopped to enable the bags to be cleaned. This is usually done by shaking or vibrating the bag supports at the closed upper ends of the bags from which end the bags are suspended. In this manner the dust is shaken loose from the bags and falls through the lower open ends of the bags to a hopper in the bottom of the chamber from which the dust can be removed. Generally there are two or more dust collecting units provided so that one unit can be shut down for cleaning while another may be in operation.

One of the major difficulties in the filtering of air, gases or smoke is the removal of the dust or solid particles embedded in the filter cloth. The material embedded in the cloth causes a blinding or clogging of the cloth which reduces the rate of filtering. In some cases there is a total blinding of the cloth.

The principal object of my invention is to remove the dust or particles collected within the filter cloth by means of directing controlled streams of air or filtered gases on the bags. The air streams can be introduced into the bag chamber at one or more places. It is also intended that the bags be suspended in such a manner as to allow the air or gas streams to impart to the bags a waving, swinging or flexing motion so essential to overcome the blinding of the filter cloth.

Another object is to regulate the force of the air stream as well as its direction into the bag chamber so as to control the amount of swinging and flexing of the bags in said chamber. The intensity of the shaking depends on the characteristics of the dust recovered in the bags as well as on the type of material used to make up the bags themselves.

My invention may also be applied in conjunction with present known mechanical shakers to reduce the wear and tear on the bags and also to increase the rate of filtering. It may be applied particularly well to filter cloth of a delicate nature such, for example, as cloth made of woven glass fibers. Other objects of the invention are to provide a number of practical and economical advantages of shaking; reduce the number of times bags must be shaken in a given period of time while increasing the effectiveness of the filtering medium and in general add greatly to the efficiency of bag house operations.

Referring to the drawings—

Figures 1, 2:
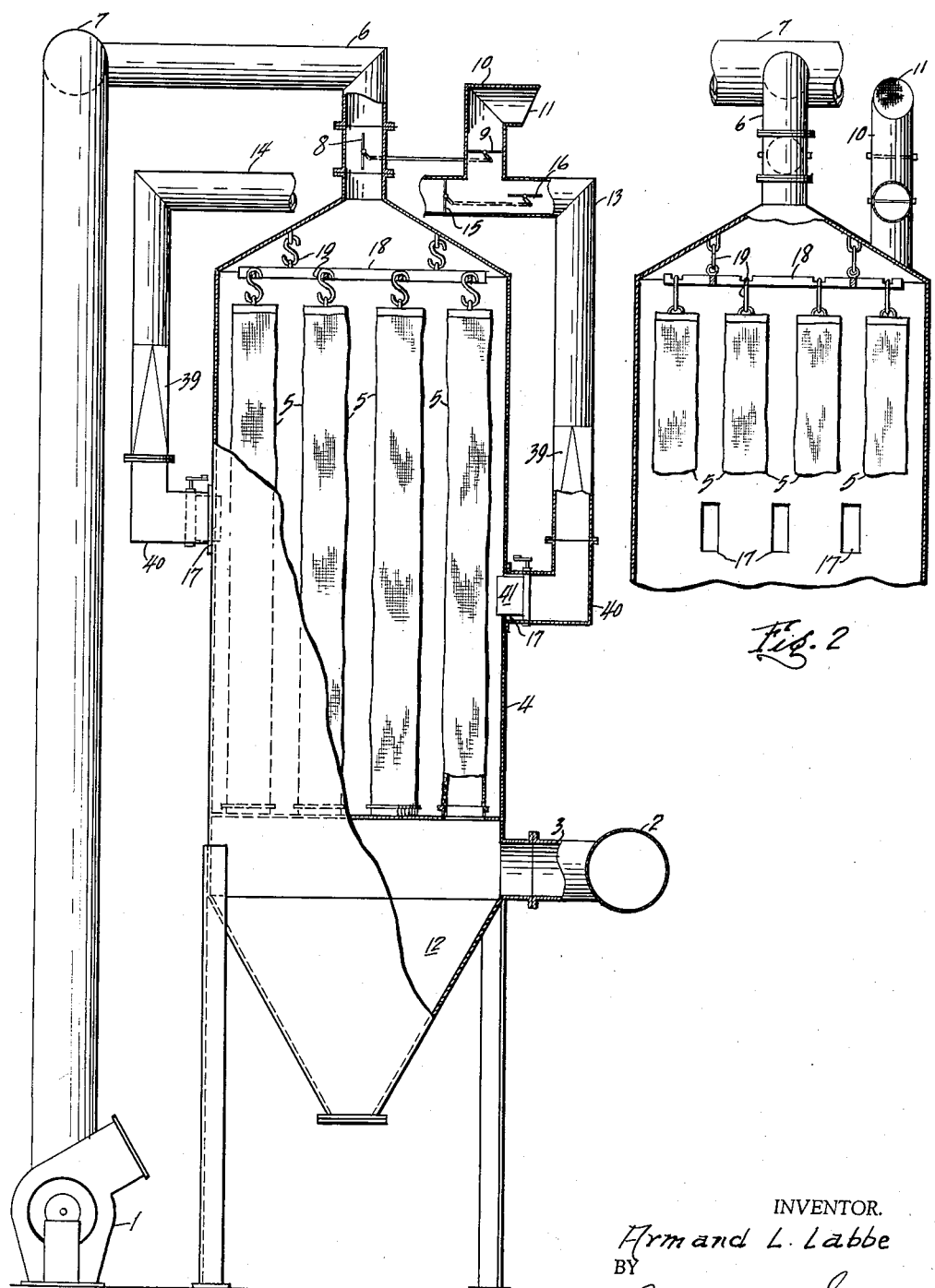
Fig. 1 is an end elevation, partly in section, showing a dust collecting device to which the invention is applied.
Fig. 2 is a fragmentary side elevation of Fig. 1, partly in section, showing the location of air or gas inlets to the dust collecting device.

Referring first to Figs. 1 and 2 of the drawings, the dust collecting device represented is the type commonly operated under a vacuum. This vacuum is created by the exhaust fan 1 which runs continually during the cleaning and filtering operations of the dust collecting units. The filtering operation is described as follows:

The dust laden air or gases flow through the main supply duct 2 into the branch ducts 3 leading into the separate collecting chambers 4 of which there are generally two or more provided in this type of operation. Here the gases enter the bags 5 at the fixed lower open ends thereof. The gases flow up into and through the walls of the filter bags 5 and are exhausted out through the branch exhaust duct 6 into the main exhaust duct 7 and into the atmosphere through the exhaust fan 1. During the filtering operation, damper 8 remains open in the exhaust line 6 and damper 9 remains closed in the air shake supply duct 10. Damper 8 is mechanically interlocked with damper 9 so that when one damper is open the other will be closed and vice versa.

When it becomes necessary to clean the filter bags the following sequence takes place. Damper 8 in exhaust duct 7 is closed which automatically opens damper 9 in the air shake supply duct 10. The dampers 8 and 9 will remain in this position for the duration of the air shake or cleaning operation. This time period will vary depending on the application and type of dust and filter bags involved. For example, we will assume the cleaning cycle would take 24 seconds which is a realistic figure. The air for cleaning the bags is drawn into the air shake duct 10 through the screened opening 11 by vacuum in the hopper 12. This vacuum is created by the dust filled air or gases being drawn into the remaining operating dust collecting units through the main supply duct 2 by the exhaust fan 1.

The air shake air can branch off into either side of the dust collecting unit through branch duct 13 or 14. The air flow to either side is controlled by the mechanically interlocked dampers 15 in the duct 14, and 16 in the duct 13. In some cases the air will be allowed to flow for, say 12 seconds, into one side for the air shake, and 12 seconds into the other side. In other cases, it will be more effective to allow the air flow into chamber 4 for the air shake from either side, alternating from side to side every 3 or 4 seconds. Here again, this would be decided by the type of dust collected and filter bags used.

The air streams enter chamber 4 through the openings 17. These openings are spaced so that the air streams will blow between the bags 5. It should be understood that the number of air streams, their location and size can be varied depending on the types of gases filtered. The intensity of the air shake can be regulated by adjusting the damper 8 in the exhaust duct 6 to provide more or less vacuum in the chamber 4. In a similar manner, damper 9 can be adjusted to allow a greater or less volume or pressure, as the case may be, to impinge on the bags. How the air will impinge on the bags will be explained below. The adjustments that can be made to dampers 8 and 9 on their intermediate linkage allows an almost unlimited amount of flexibility to obtain the maximum efficiency of shaking. A higher efficiency of shaking is obtained by having a certain amount of vacuum in the hopper 12 of sufficient magnitude to cause the bags to collapse after three to five seconds of air shaking. As previously stated, there is always a vacuum in the hopper of this type of dust collecting unit.

The effectiveness of air shaking can further be improved by the method of hanging the bags at the closed upper ends thereof. It is intended that by hanging the bags to the upper framework 18 with loose S-shaped links 19, or by equivalent means, a higher cleaning efficiency will be obtained by allowing the filter bags to flex with greater freedom.

Figure 3:
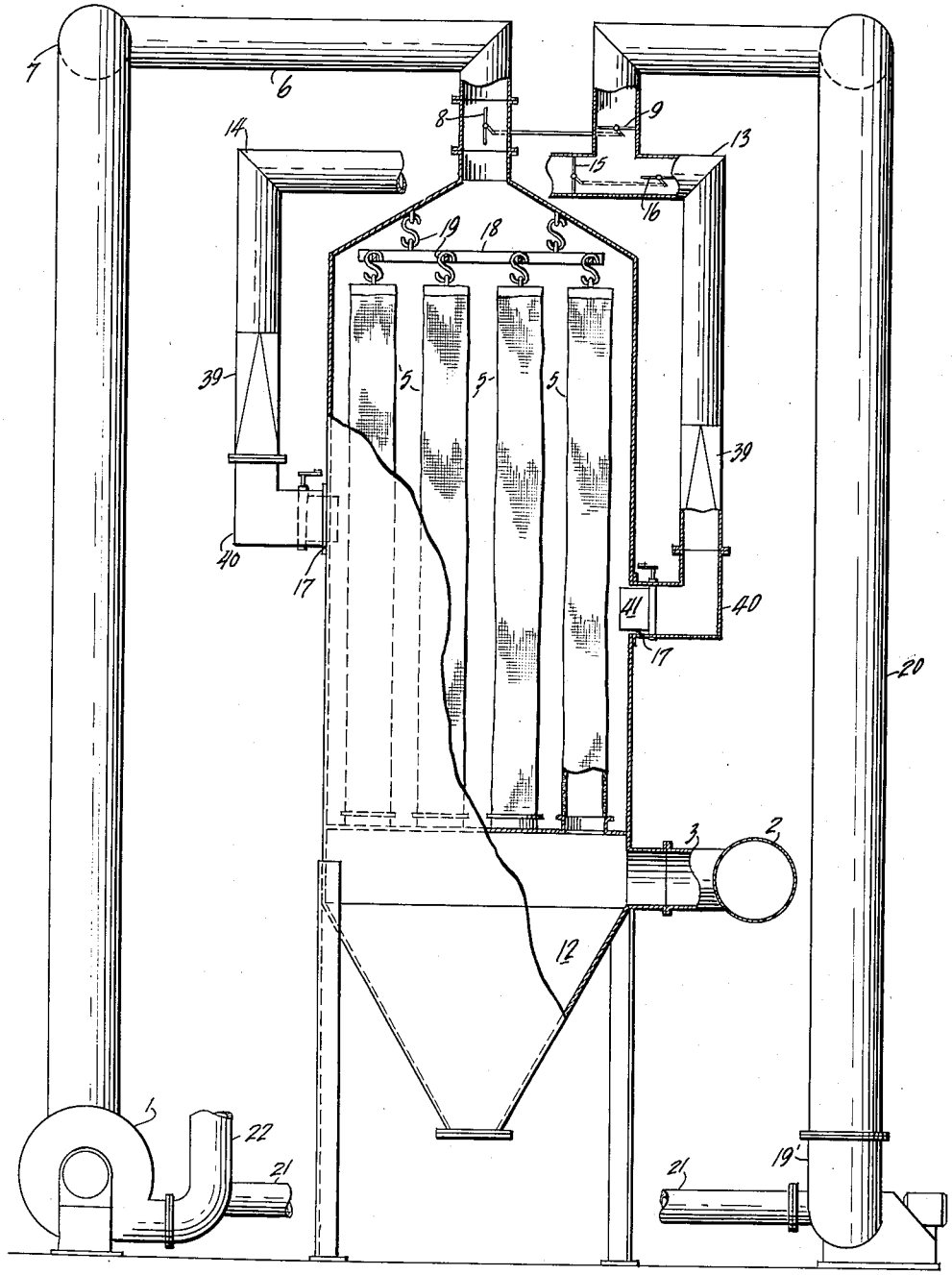
Fig. 3 is an end elevation, partly in section, of a modification of the dust collecting device shown in Fig. 1 to which the invention is applied.

Referring now to Fig. 3, the dust collecting device shown is also similar to the type of unit commonly operated under a vacuum. However, this baghouse differs from the unit shown in Fig. 1 in that a separate fan 19' supplies hot filtered exhaust gases to the air shake supply duct 20. The air shake supply fan 19' draws the filtered exhaust gases through the branch exhaust duct 21 from the exhaust line 22. The remaining sequence of operations for filter bag cleaning is identical to the above mentioned method. Instead of drawing the air or gases for the air shake into the chamber 4 by the vacuum in the hopper 12, the air or gas is blown in under pressure by the air shake supply fan 19'. It is not absolutely necessary to have a vacuum in the hopper 12, although the filter bag cleaning by air shake is more efficient and also more rapid with vacuum than pressure. Nevertheless, even under pressure, air shake is far more efficient than any other known type of shaker and particularly with either mechanical horizontal or vertical shakers. The identification of the remaining parts and components for Fig. 3 is the same as shown and identified for Figs. 1 and 2.

Figure 4:
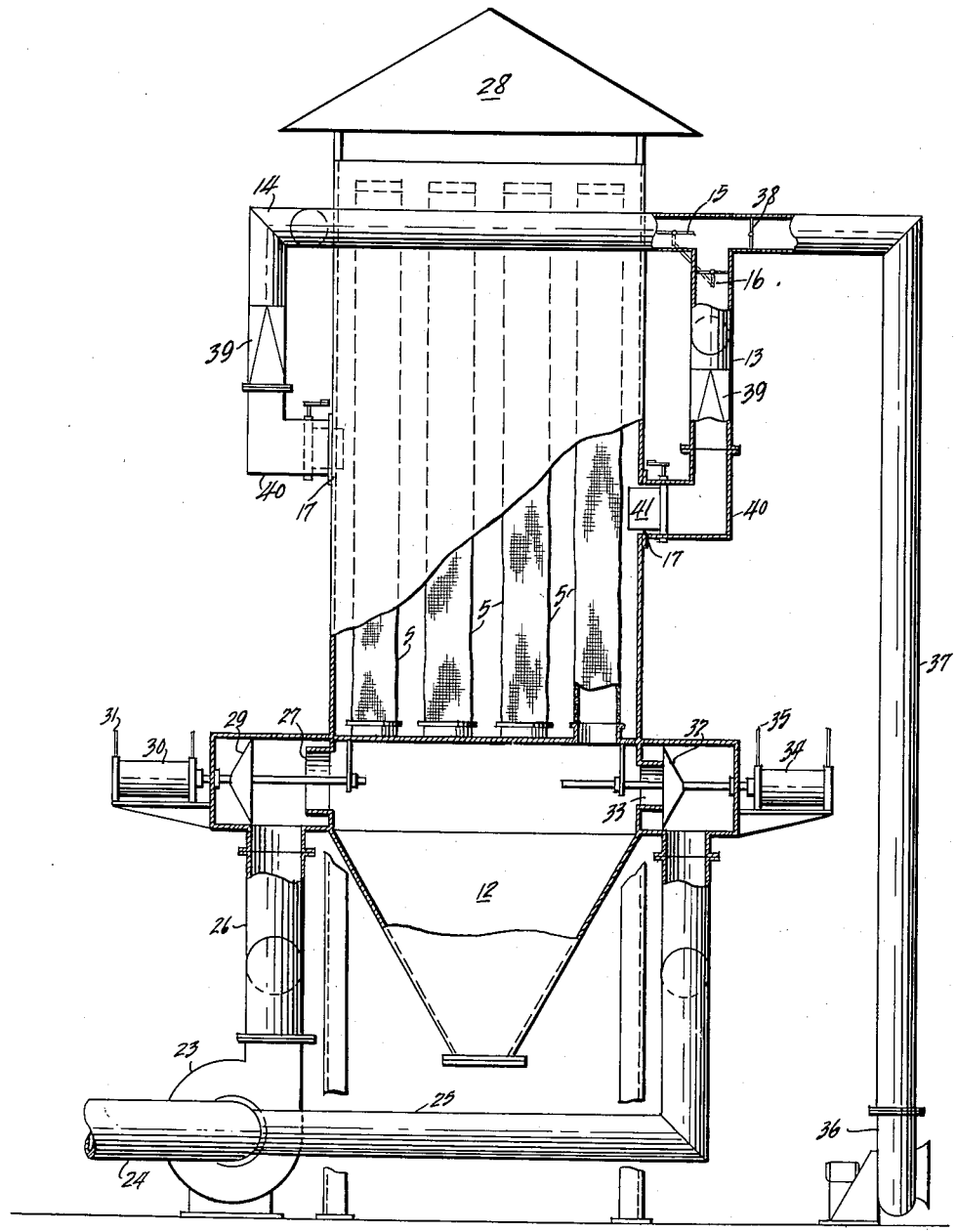
Fig. 4 is an end elevation, partly in section, of still another modification to which the invention is applicable.

Fig. 4 shows an application of the air shake to what is ordinarily referred to as a dust collecting unit or baghouse operated under pressure. In this type of collection device, the gas or air to be filtered is delivered to the unit under pressure by the blower 23. The suction side of the main supply blower 23 is duct 24, which has a branch duct 25 leading to one side of the chamber 4 as shown. The gas is blown into the collecting units through the supply duct 26, into the entrance to chamber 4 at the opening 27 and up into and through the filter bags 5. The clean filtered gas escapes to the atmosphere under the roof 28 of the baghouse as shown. The supply opening 27 can be opened or closed by covering or uncovering the opening with the slide damper 29. The damper 29 is operated by the air cylinder 30, which in turn can be controlled by an electric solenoid valve (not shown) in the air line 31.

Normally, the cleaning cycle for this type of baghouse operation is as follows. Slide damper 29 is closed. Then slide damper 32, which is closed during the filtering operation, is opened in what is known as the depressurizing opening 33 by the air cylinder 34. The air cylinder 34 is also controlled by an electric solenoid valve (not shown) or equivalent in the air line 35. This action reverses the air flow in the chamber 4 and in the filter bags 5, since the branch duct line 25 is opened to the suction side of the main supply blower 23, causing the filter bags 5 to collapse. The application of air shake, used in conjunction with the depressurizing action of this type of collecting unit, can improve the efficiency of this unit appreciably. By adding an air shake blower 36 to supply air for shaking to the main air shake supply duct 37 and opening damper 38, the cleaning of the filter cloth bags 5 can be greatly improved. The air shake air branches off into either side of the dust collecting unit, through branch ducts 13 or 14. The sequence of timing and control of the dampers in the air shake lines will be explained below. In some cases it will be possible to supply hot filtered gases for the air shake in similar types of dust collecting devices. It is also possible to use an air shake blower 36 which will supply air, or hot filtered gas, to the air shake openings 17 in the chamber 4 at comparatively high pressure with lower air volume to produce a more concentrated stream of air on the filter bags. This may be required in cases of extreme blinding of the filter cloth.

In Figs. 1–4 the air or hot gas used for the air shake is delivered under pressure or induced by the vacuum in the baghouse chamber. The air delivered enters the chamber, as shown in Fig. 2, through the openings or passages 17. The openings are shown to be located between each row of filter bags, and also nearly midway along the length of the bags. It should be noted that the air shake openings are not directly opposite each other when reference is made to Figs. 1, 3 and 4, but are located so that one side of the openings is higher than the opposite side of the air shake openings. Also, it has been demonstrated that in some instances, the air opening could be a continuous slot across the face of the bags.

Still referring to Figs. 1–4, which are representative of the types of filter bag dust collection units to which air shake can be applied, the air or gas for air shaking is carried through the branch supply ducts 13 and 14 on both sides of the chamber walls. These ducts then fan out to the full width of the chamber walls, or enough to cover the full width of the slots or openings 17, as shown in Figs. 1 and 2, for example. This change in width is accomplished by the transition piece 39. To this is fastened a directional vane housing 40, which is a full width elbow bolted to the side of the chamber wall 4 over the air stream inlet openings 17. Inside and on the directional vane housing 40 are the means for mounting and controlling the air streams onto the filter bags inside the baghouse with oscillating directional vanes 41.

Figure 5:
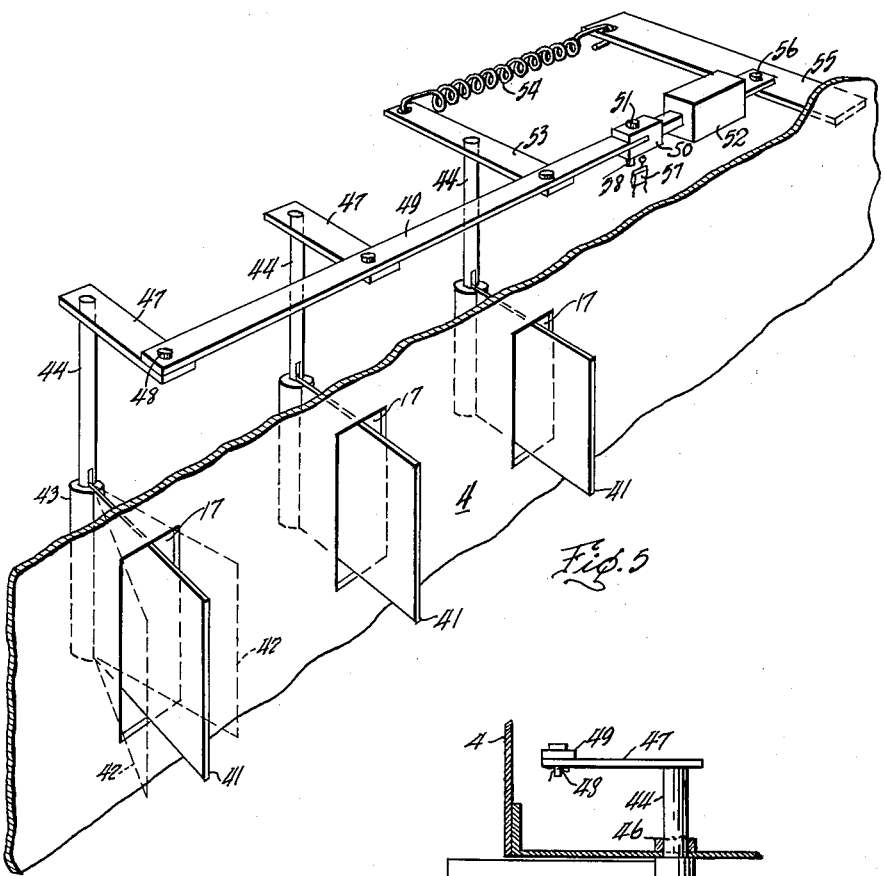
Fig. 5 shows in perspective the detail of the directional vane in the air or gas inlet manifold as applied to the dust collecting devices shown in Figs. 1–4.
Figure 6:
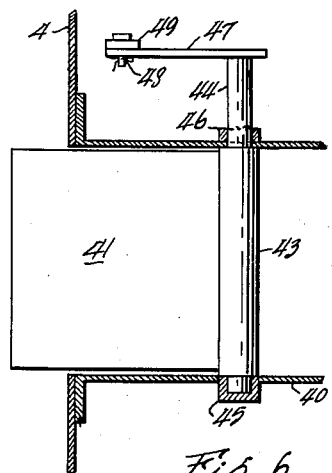
Fig. 6 is an end elevation, partly in section, of Fig. 5.
Figure 7:
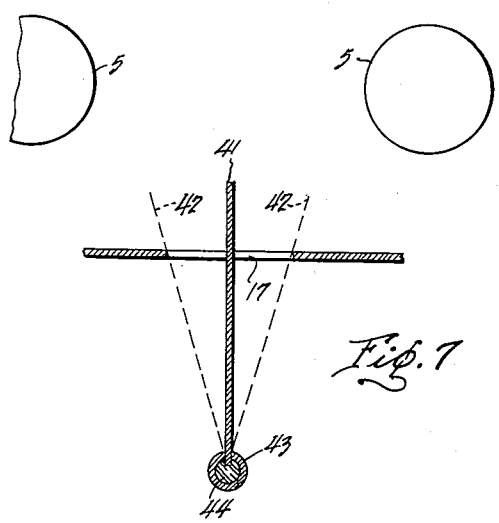
Fig. 7 is a fragmentary plan view, partly in section, of Fig. 5.

Turn now to the apparatus illustrated in Figs. 5–7, which shows in greater detail the construction of the directional vanes 41 and their operation. The addition and use of directional vanes in the air shake openings increases the effectiveness of air shake, and particularly in cases of comparatively extreme clogging of the filter bag cloth. The movement of these vanes will create sudden blows or streams of air on the surfaces of the bags by directing the air on and away from the bags in turn, which tends to create a sudden or a rather severe flexing of the bags. The harshness of this flexing will be determined by the material make-up of the bags as well as on the type of dust collected. Fig. 5 shows in perspective the directional vanes 41 protruding into the chamber wall 4 through the openings 17. During the period of air shaking, the vanes are made to oscillate back and forth as often as two or three times a second or less. The amount of movement is indicated by the dotted lines 42. Movement of the vanes is through a mechanical linkage which is described as follows.

Refer now to Figs. 6 and 7. The vanes 41 are held at one end by tack welding to a length of reamed pipe, which will be called the vane holder 43. The vanes 41 are extended partly into the vane holder 43 so that the end of the vane will fit the keyed portion of an extended vane shaft 44 which in turn fits inside the vane holder 43. The vane shaft 44 extends through the top of the housing 40 as shown in Fig. 6. The bottom of the shaft 44 is seated in the housing 45 and held at the top by housing 46, where the shaft is free to rotate in both housings. To the top of the vane shaft 44 is fastened a piece of flat stock, called the lever bar 47, shown in Fig. 5. Connected by cotter pins 48 or equivalent to a series of lever bars 47, is a long length of flat stock called the connecting link 49.

To one end of the connecting link 49 is fastened a yoke 50. The yoke is pinned to the link by the cotter pin 51 to allow pivoting about the pin to take place. The yoke 50 is part of the plunger of an electric solenoid 52. On the opposite side of the extended lever bar 53 is a place for attaching a return spring 54, so that the action of the spring 54 and the electric solenoid 52 will rotate about the center of the bar 53 where the vane shaft 44 is attached. Both the solenoid and the spring are anchored to a fixed base 55, which is either welded or bolted to the side of the chamber wall 4. The solenoid 52 is held to the base 55 by a cotter pin 56, or equivalent, so that the solenoid is free to pivot about this point, which is necessarily due to the nature of the mechanical linkage used for purposes of illustrating how air shaking can be made to operate. The solenoid 52 and the spring 54 serve as the means for moving the directional vanes 41 back and forth. The solenoid 52 pulls to the right when energized, as best shown in Fig. 5, until the end or nearly the end of its stroke is reached. The solenoid pulls against the resistance of the spring 54 with enough force to overcome this resistance. The design and selection of the spring and solenoid is determined with this factor in mind. As the end of the solenoid stroke is reached, a limit switch 57, bracketed to the chamber wall 4, makes contact with a feeler 58 on the yoke 50, opening the electrical circuit to the solenoid 52. At this point, the spring 54 will be extended and will pull on the lever bag 53 so as to reverse the direction of the vanes 41. The limit switch 57 then closes the electrical circuit to the solenoid 52 by the widthdrawal of the yoke 50 and feeler 58 by the force and action of the spring 54. By the time the solenoid 52 overcomes the momentum of the spring pulling, the vanes 41 will have travelled the required arc and again act in the direction of the solenoid 52, pulling against the resistance of the spring 54. By moving the directional vanes 41 in the prescribed manner in the air shake openings 17 in the side of the chamber walls 4, the air or gas streams are directed toward either side of the rows of bags and onto the bags themselves. This is best illustrated by referring to Fig. 7. Movement of the vanes is maintained as long as air or gas is allowed into the branch ducts for air shaking.

Figure 8:
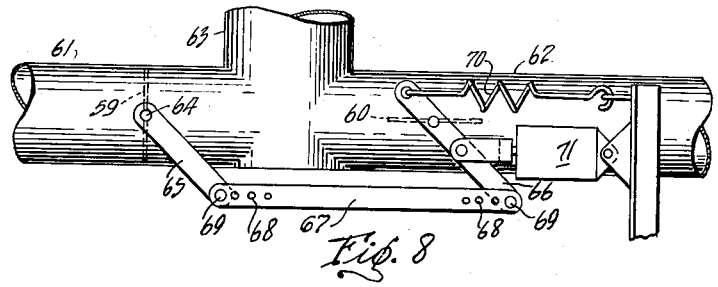
Fig. 8 is a representative side elevation view showing the damper controls for the air or gas entering or leaving the dust collecting devices shown in Figs. 1–4.

The purpose of the interlocked dampers in the air shake branch lines, the main air shake duct and the exhaust branch lines of the dust collecting units have been previously discussed. Referring now to Fig. 8, dampers 59 and 60 represent the dampers in the branch air shake ducts 61 and 62 branching off from the main air shake duct 63. They could just as well represent the interlocked dampers in the branch exhaust duct and the main air shake supply duct, shown in Fig. 1, for example.

The dampers are fixed to the shafts 64 and are rotated about this point with the shaft. The shafts extend through the sides of the ducts so that the lever arms 65 and 66 can be fastened to the shafts. The lever arms are made to operate together by interlocking them with a connecting bar 67. The connecting bar 67 has holes 68 drilled along the length of the bar, spaced from each end thereof, through which cotter pins 69 can be fitted to hold the lever arms 65 and 66 to the connecting bar 67. The holes allow the dampers to be cocked at varying angles with respect to one another and serve as a means of regulating the volume of air or gases used in the air shaking, or regulating the exhaust system. Generally, damper 59 will close duct 61 and damper 60 will open duct 62, or vice versa. The whole mechanical linkage is operated by the spring 70 and the electric solenoid 71 in much the same manner as the directional vanes previously described. In this instance, however, there is a considerably longer time interval involved in that the solenoid will hold the dampers in one position for several seconds or longer and, in some cases, for the duration of the air shake. When the electric circuit to the solenoid is opened, the spring will reverse and hold the dampers in the alternate position until the solenoid is again energized.

Figure 9:
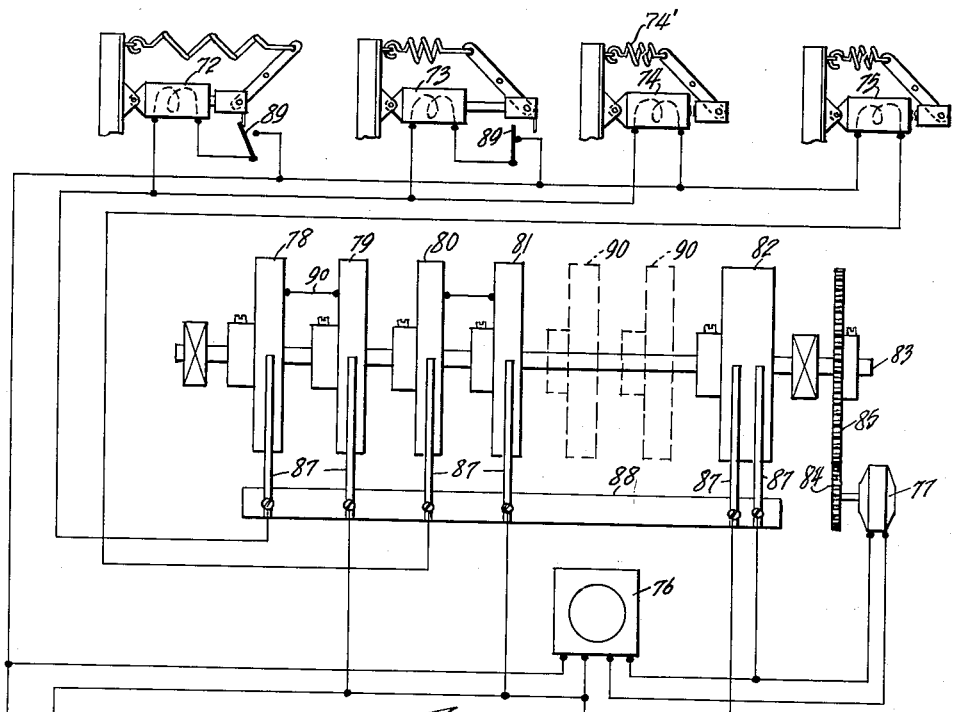
Fig. 9 is a wiring diagram for the controls needed to operate the invention and give it the flexibility desired for the different types of dust collecting devices.
Figure 10:
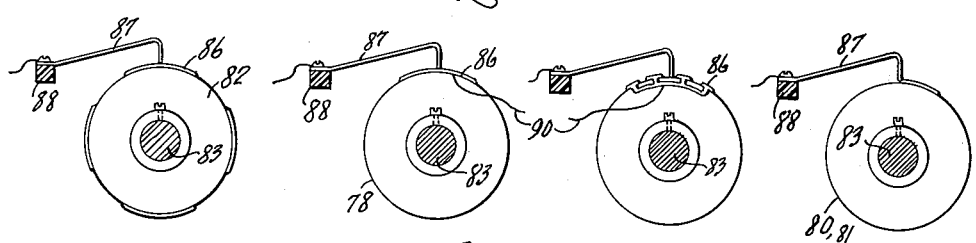
Fig. 10 is a detail of the cams used on the timing device for controlling the electrical circuits required by the invention.

The electrical control for the operation of the various solenoids employed in the operation of the air shake is shown in Figs. 9 and 10. The solenoids 72 and 73 are the units which operate the directional vanes in the air shake branch line ducts on either side of the chamber walls. Solenoid 74 operates the interlocked dampers in the main air shake supply duct and the exhaust duct. Solenoid 75 operates the interlocked dampers in the branch air shake ducts which allow the air or gas for the air shaking alternately to enter the chamber on either side of the dust collection unit. The electric timer control clock 76 closes the circuit to the electric timer motor 77 at a pre-set time, starting the timer motor 77 which drives the timing cams 78, 79, 80, 81 and 82 mounted on the shaft 83 through gears 84 and 85.

The timing cams are made of a dielectric material. On and around the periphery of the cams, at different spacing, depending on the operating characteristics of the electrical circuits desired, are copper strip contacts 86 which open or close circuits to the solenoids. The copper spring fingers 87 are fastened to the dielectric bar 88, and are placed so that the points of the fingers 87 will ride on and off the copper strips 86 as the cams are rotated. This is best illustrated by referring to Fig. 10. To the other end of the fingers 87 are fastened the wire leads to the different solenoids and switches in the control circuit.

The electrical controls operate as follows: The electric timer clock 76 closes the circuit to the timer motor 77 just long enough for the copper strip contacts 86 on the cam 82 to make contact with the spring finger 87 and keep the timer motor 77 running for the entire period of a cycle to shake one bag chamber, say 24 seconds. The cam 82, as shown in Fig. 10, has four copper strips 86, which means that the timer motor and all the controls and wiring would operate four dust collecting units. The gearing and speed of the timer motor is such that at the end of 24 seconds, the fingers 87 on the cam 82 ride off the copper strip 86 to open the circuit to the timing motor 77. The timing motor 77 will not start again until the timer clock 76 closes the circuit to the motor 77. The timer clock may be set for whatever intervals are required for cleaning the bags in the dust collecting units.

In the sequence of shaking a chamber, cams 78 and 79 energize the solenoid 74, which works in conjunction with the spring 74' to open and close the interlocked dampers in the main air shake supply duct 10 and the branch exhaust duct 6 in Figs. 1 and 2, for example. At the same time, it controls the circuit to solenoids 72 and 73, which operate the directional vanes 41 in the air shake ducts 40 in Figs. 1 and 5. The limit switch 57 of Fig. 5 is indicated by the switches 89 shown in Fig. 9, the operation of which has previously been discussed. The circuit between cams 78 and 79 is made by connecting a wire 90 to the copper strips 86 of these cams. It will be noted that cam 79 has four separate copper strips with a break between each on the periphery of the cam and is interconnected by copper on the side with the wire lead 90 indicating the connection to the copper strips on cam 78. It has been found that one air blow on the bags is sufficient in some applications, but two or more consecutive blows are more effective in other instances. Cam 79 in Fig. 10 shows the arrangement for four consecutive blows. In the 24 second bag cleaning cycle the main air shake duct damper and the branch exhaust duct open and close four times.

The cams 80 and 81 open and close the circuit to the solenoid 75 which controls the dampers 15 and 16 in the air shake branch ducts 13 and 14, as shown in Fig. 1. These cams are arranged so that the air or gas for shaking is diverted to one side of the chamber for half of the 24 second cycle time, and to the other side for the other half of the 24 second cycle. In this manner, the solenoid 75 is energized for 12 seconds to hold the interlocked dampers in one position, then the circuit to the solenoid is opened so that the spring holds the dampers in the alternate position for the remaining 12 seconds. The number of cams that can be fastened onto the shaft 83 for other circuits in this type of timing mechanism can be as much as twenty or more, depending on the number of circuits desired. In Fig. 9 two additional cams 90 are outlined by dotted lines for the purpose of illustration.

While this invention has been illustrated herein by reference to the detailed construction of specific mechanical linkages and mechanisms, it should be understood that such details can be changed or substituted by other means without changing or departing from the true scope of the invention.

What I claim is:

1. In a dust collecting device; means forming a cabinet, a plurality of filter bags, means for suspending said bags in said cabinet in parallel disposed relation with their longitudinal axes substantially vertical, said bags being closed at the top and open at the bottom with their bottoms secured around openings in a substantially horizontal partition of said cabinet, said cabinet having a plurality of passages formed in the sides thereof in a zone intermediate the tops and bottoms of said bags; ducts leading to said passages, means for creating a flow of fluid, such as air or gas, through each of said ducts and passages at substantial velocity to impinge on said bags, and means within each of said ducts at said passages to fan said fluid into a rapidly oscillating stream transversely of said bag axis to effect a vibration of said bags and impart a shaking action thereto.

2. The structure set forth in claim 1 in which the means for creating the flow of fluid is a motor driven blower.

3. The structure set forth in claim 1 in which the means for creating the flow of fluid is means for lowering the atmospheric pressure in said cabinet substantially below the pressure in said duct.

4. The structure set forth in claim 1 in which said last named means includes a pivotally mounted vane in said opening; and means for alternately swinging said vane to direct the incoming stream of fluid to the right and left.

5. In a dust collecting device; means forming a cabinet, a plurality of filter bags, means for suspending said bags in said cabinet in parallel disposed relation with their longitudinal axes substantially vertical, said bags being closed at the top and open at the bottom with their bottoms secured around openings in a substantially horizontal partition of said cabinet, said cabinet having a passage in the side thereof in a zone intermediate the tops and bottoms of said bags; a duct leading to said passage, means for creating a flow of fluid, such as air or gas, through said duct and passage at substantial velocity to impinge on said bags, a pivotally mounted vane in said passage, a solenoid for moving said vane in one direction and spring means for moving said vane in an opposite direction whereby to fan said fluid into a rapidly oscillating stream transversely of said bag axis to effect a vibration of said bags and impart a shaking action thereto.

6. The structure set forth in claim 5, including a limit switch for de-activating said solenoid when it has moved said vane in one direction, whereby said spring means is free to move said vane in the opposite direction.

7. In a dust collecting device; means forming a cabinet, a plurality of filter bags, movable means for suspending said bags in said cabinet in parallel disposed relation with their longitudinal axes substantially vertical, said bags being closed at the top and open at the bottom with their bottoms secured around openings in a substantially horizontal partition in said cabinet, passages formed in opposite sides of said cabinet; said passages being intermediate the tops and bottoms of said bags and in zones vertically spaced from each other; a separate duct leading to each of said passages, means for alternately creating a flow of fluid, such as air or gas, through said ducts and passages at substantial velocity to impinge on said bags, and means within each said duct at said passage to fan said fluid into a rapidly oscillating stream transversely of said bag axis to effect vibration of said bags and to impart an oscillatory shaking action thereto and to said movable means.

8. The structure set forth in claim 7 in which said means for alternately creating a flow of fluid includes a pair of rotatably mounted dampers between said ducts and means interconnecting the same to rotate in unison alternately to direct said fluid flow.

9. The structure set forth in claim 7 in which said last named means includes a timer control clock and mechanism therefor.

10. The structure set forth in claim 8 in which said interconnecting means comprise pivotally connected links; a solenoid connected thereto to move said links and rotate said dampers in one direction, and spring means connected thereto to move said links and rotate said dampers in the opposite direction.

References Cited in the file of this patent

UNITED STATES PATENTS

| 1,153,751 | Beth | Sept. 14, 1915 |
| 2,682,316 | Kaufmann | June 29, 1954 |
| 2,732,912 | Young | Jan. 31, 1956 |
| 2,854,091 | Roberts et al. | Sept. 30, 1958 |

FOREIGN PATENTS

| 401,186 | Germany | Aug. 29, 1924 |
| 610,391 | Germany | Mar. 9, 1935 |
| 282,849 | Great Britain | Dec. 28, 1927 |
| 519,180 | Great Britain | Mar. 19, 1940 |